Oct. 17, 1950 R. M. SOMERS 2,525,968

REPRODUCING ARM SUPPORT MECHANISM

Filed Oct. 29, 1947

Inventor

Richard M. Somers by Henry Lanahan

Attorney

Patented Oct. 17, 1950

2,525,968

UNITED STATES PATENT OFFICE 2,525,968

REPRODUCING ARM SUPPORT MECHANISM

Richard M. Somers, West Orange, N. J., assignor to Thomas A. Edison, Incorporated, West Orange, N. J., a corporation of New Jersey Application October 29, 1947, Serial No. 782,737

10 Claims. (Cl. 274—24)

This invention relates to phonographic machines for recording and/or reproducing dictation. The invention has particular utility in connection with dictating machines of the disk-record type, and is herein described in terms of such machines, but no unnecessary limitation thereto is intended.

The invention relates particularly to improved mounting arrangements for the translating unit of a reproducing machine, which will result in better tracking of the reproducer, and which will tend to maintain the reproducer in a centralized position relative to the carriage so that there is enabled accurate indexing of the recorded matter—i. e., accurate locating of the reproducer stylus on the record whereat corrections and other annotations have been made.

For best tracking of a record groove, the reproducer stylus should traverse a radius line of the disk record so that no lateral biasing forces will be present tending to displace the stylus from the record groove. In a combined recording and reproducing machine, wherein recording and reproducing translating units are carried by a common carriage, the recording and reproducing styli are typically arranged to engage the record at points spaced from one another on a line arcuate about the center of the record. Usually, as a best compromise, the styli are placed at opposite sides of a radius line of the record along which the carriage is moved. When the reproducer stylus moves along a path offset from a radius line of the record, the frictional force of the record on the stylus tends to displace the stylus laterally out of the groove. This lateral force, together with other lateral forces which may be present due to unevenness of the record surface and tilting of the machine, must always be substantially less than the tracking force of the stylus in the groove.

When feeding from an unrecorded area to a recorded area, particularly one recorded by the embossing method and characterized as having ridges along the edges of the groove, there is a delay of the reproducer in entering and leaving the groove and, as a result, the reproducer is displaced laterally, usually against one or another of its lateral limit stops, and there are repeats of the last groove convolution. Even when the reproducer stylus is riding on a smooth, ungrooved record surface, as before it enters the first groove convolution and after it leaves the last convolution of a recordation, the lateral biasing forces above mentioned tend to displace the reproducer against one or another of its lateral stops. Since these stops must typically be spaced apart sufficiently to allow the reproducer stylus to have a lateral play through the width of several grooves, the reproducer may be displaced from the position indicated by the indexing element of the machine by a distance corresponding to one or more sentences of recorded dictation.

According to the present invention the reproducing device is provided with a novel centering means which is adapted to overcome these many uncertain and undesired effects typically present in reproducing recorded dictation. A particular object of the invention is to provide an adjustable centering means of sturdy construction and practical dimensions which provides a desired light biasing force on the reproducer to maintain it normally in a position corresponding to that of the indexing element while allowing it to track still an eccentric groove convolution.

These and other objects and features of my invention will be apparent from the following description and the appended claims.

In the description of my invention reference is had to the accompanying drawings, of which:

Figure 1:
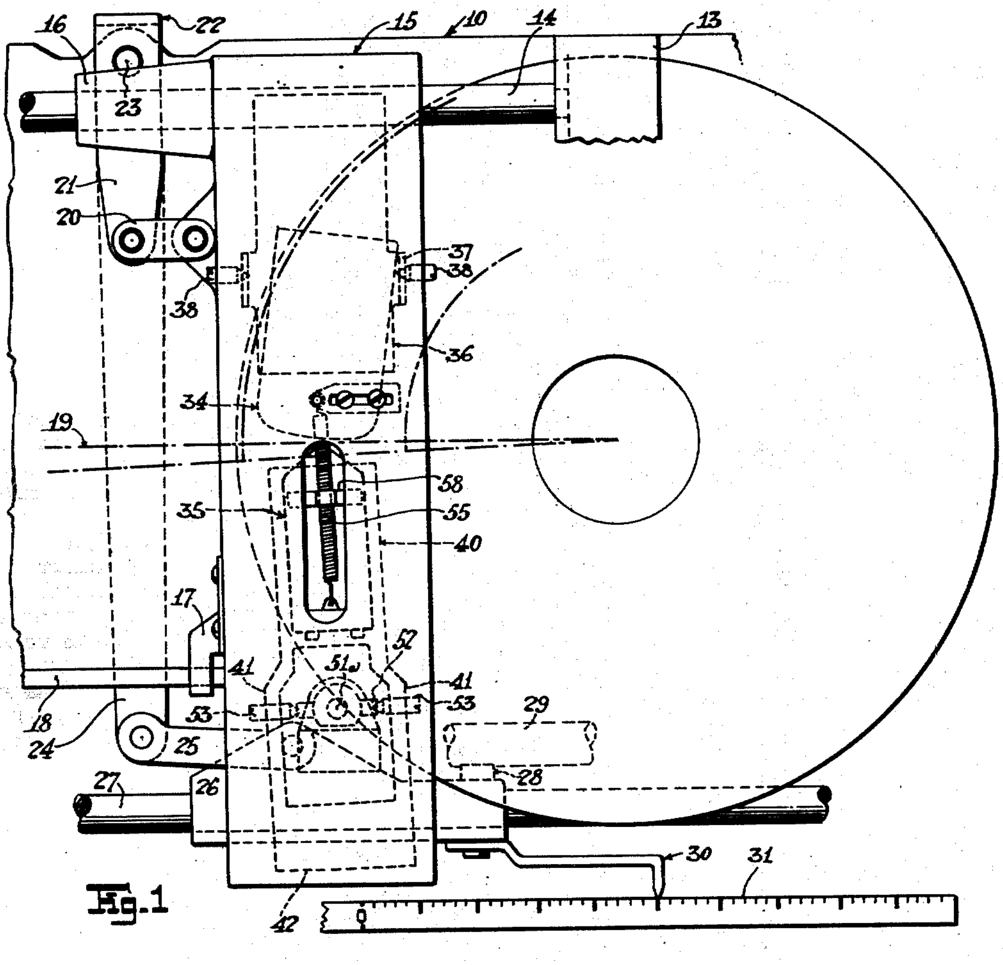
Figure 1 is a fractional plan view of a dictating machine in which my invention is incorporated.
Figure 2:
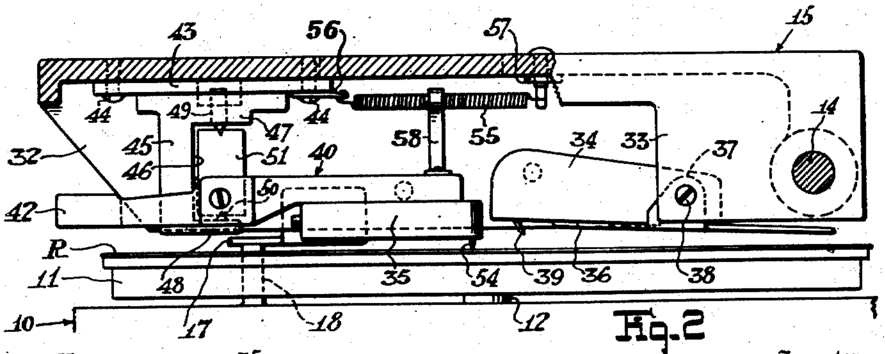
Figure 2 is a fractional righthand elevation of the machine of Figure 1 with a portion of the carriage broken away.

The dictating machine shown in Figures 1 and 2 has a frame plate 10 at the top thereof which is fractionally shown. Overlying the righthand portion of this plate is a turntable 11 for a disk record R. This turntable is journalled to the frame plate as at 12. At the rear of the turntable the frame plate has a standard 13 supporting one end of a transverse rod 14 fractionally shown. A carriage 15 for the phonographic translating means of the machine overlies the left half portion of the turntable and has a long bearing 16 at its rear which is slidably mounted on the rod 14. At the front of the carriage there is a depending shoe 17 which rests slidably on a transverse rail 18 provided on the front portion of the frame plate. This mounting of the carriage permits it to have a traveling movement along a radius line 19 of the record R.

The carriage is coupled by a link 20 to one arm 21 of a lever 22 that is pivoted at 23 to the rearward portion of the frame plate. The lower arm 24 of this lever lies below the frame plate and extends to the front thereof. This front portion of the lever is coupled by a link 25 to a slide 26 that is mounted on a transverse rod 27. This slide carries a feed nut 28 which engages a feed screw 29 fractionally shown. As is well known in the art, the feed screw is intercoupled with the turntable so that the two are driven simultaneously as by a suitable motor not shown. In the present machine the turntable is rotated clockwise as the carriage is moved rightwardly.

On the slide there is an indexing member 30, shown simply as a pointer, which moves along an index slip 31. Since the lever 22 provides approximately a four-times stepdown in movement transmission from the slide 26 to the carriage, this indexing member is moved through approximately a four times greater distance than is the traveling movement of the carriage. This amplification of the indexing movement is particularly important in dictating machines of the disk-record type because each groove convolution on a disk record contains much more dictated matter than does a groove convolution on a cylinder record such as has been commonly used.

The carriage 15 is an oblong structure having a depending leftward flange 32 along its full length and a depending rightward flange 33 at the rearward end. (It is on the leftward flange 32 that the aforementioned shoe 17 is mounted.) Within the rearward and forward portions of the carriage there are mounted recording and reproducing devices 34 and 35 respectively. These are unitary devices—each of which may be of standard form—which are placed end to end at opposite sides of the radius line 19.

The recorder device 34 is mounted on a plate 36 having upturned ears 37 at the rearward end of the recorder. These ears are apertured to receive the conical ends of pivot screws 38 that are threaded through the side flanges of the carriage. The axis of these pivot screws is substantially parallel with the record face so that the forward free end portion of the recorder may be raised from and lowered onto the record, the means for so raising and lowering the recorder being however not herein necessary to show. On the free end portion of the recorder there is a depending stylus 39 which engages the record at a distance following the radius line 19 in respect of the direction of rotation of the record. The recorder device is positioned so that a medial lengthwise plane through its stylus is substantially tangential with the record groove contacted by the stylus when the recorder is in a mid-position with respect to its range of traveling movement across the record. However, the pivot axis for the recorder is substantially parallel with the radius line 19. As a result, the frictional drag of the stylus on the record tends, throughout the full range of travel of the recorder, to turn the recorder always in a counterclockwise direction as viewed in Figure 1; this is beneficial in tending to eliminate chatter at the pivots 38 should these pivots have play in the apertures of the ears 37.

The reproducing device 35 is mounted on the rear end portion of a lever 40 which has forwardly-extending bifurcated arms 41 joined at their ends by a counterbalancing weight 42. Above the reproducer there is a plate 43 secured by screws 44 to the under side of the carriage, and mounted on this plate is a depending post 45 that extends through the space between the bifurcated arms 41. This post has a central cutaway 46 to provide it with top and bottom legs 47 and 48. In these legs are cone pivots 49 and 50 which engage the opposite ends of a cylinder 51 to support the cylinder for pivotal movement about its longitudinal axis 51*a*, this being an axis at right angles to the face of the record R. This cylinder carries a transversely-extending rod 52 which has recesses in the end faces thereof engaged by cone-tipped pivot screws 53, these pivot screws being threaded through the two bifurcated arms 41. Thus, the rearward or free end portion of the reproducer device has an up-and-down freedom of movement about the longitudinal axis of the transverse rod 52 and has a lateral freedom of movement, in the direction of traveling movement of the carriage, about the vertical axis 51*a*. On the free end portion of the reproducing device there is a depending stylus 54 for contacting the record R at a distance in advance of the radius line 19 relative to the direction of rotation of the record.

The lateral freedom of movement of the reproducing device is provided to enable the reproducing stylus to track readily the groove convolutions on the record R. It is desired though that this reproducing stylus be always, as nearly as possible, in a central position in its range of lateral movement relative to the carriage so that the indexing means will give accurate indications of the true position of the reproducer stylus on the record. Preferably, this centralized position is one wherein a medial line through the vertical pivot axis 51*a* and reproducer stylus 54 is tangent to the record groove at the point contacted by the reproducing stylus when the reproducing device is in a mid-position with respect to its range of traveling movement across the record. At this mid-position of the reproducer the drag of the stylus on the record will not tend to displace the stylus laterally. Since this medial line of the reproducer deviates from tangency with the record groove as the reproducing device is moved from its mid-position with respect to the record—it being less than 90° with the record radius line through the reproducing stylus when the reproducer is at the outer portion of the record, and being greater than 90° when the reproducer is at the inner portion of the record—the drag force of the stylus on the record exerts a lateral thrust tending to swing the reproducer inwardly relative to the record when the reproducer is at the outer portion of the record and vice versa when the reproducer is at the inner portion of the record. However, this lateral thrust is held within minimum limits since the medial line of the reproducer is tangent to the radius line of the record through the reproducing stylus when the reproducer is at the middle of its traveling range of movement.

By the present invention, the reproducing device is maintained yieldably in a centralized position with respect to the carriage by a novel biasing means. This biasing means overpowers the lateral thrust exerted on the reproducer by the record stylus drag but must be substantially less than the record tracking forces—i. e., the forces which tend to maintain the stylus in the record groove. In fact, the record tracking forces are very small since the groove depth is very shallow, it being typically about .0002″ deep. For this reason the centralizing biasing force on the reproducer must be comparably small and the reproducer must be carefully balanced with respect to its vertical pivot axis 51*a*.

I have devised a means for producing a centralizing biasing force on the reproducer which has the desired small magnitude but which is not delicate in construction or critical in adjustment.

In the preferred form of this biasing means there is a helical spring 55 connected under tension between two points of the carriage 15 as between a lug 56 secured to the carriage by one of the screws 44 and a depending lug of a bracket 57 that is adjustably secured to the carriage. Preferably this spring is positioned so that the longitudinal axis thereof coincides substantially with a radius line of the pivot axis 51*a*. Secured to the free end portion of the reproducer is an upstanding member 58 which has a loop at its upper end embracing the central portion of this tension spring. In response to the lengthwise tensioning of the spring the central portion thereof has a relatively light compliance in sidewise directions which serves to bias lightly the reproducer into a desired centralized position relative to the carriage. By obtaining the reproducer biasing in this manner the need for a delicate biasing spring is avoided and manufacturing tolerances are greatly relaxed. Moreover, by making this tension spring relatively long, the reproducer has ample freedom of movement in up-and-down directions to enable it to be raised sufficiently above the turntable to clear the path of mounting and removal of a record on and from the turntable. The means for so raising and lowering the reproducer need however not be herein described.

The advantages of this biasing arrangement may be very simply demonstrated. Typically, the centralizing biasing force on the reproducer, for a displacement thereof through the width of a groove or more, should be less than 1 gram. Upon using the biasing arrangement above described, the centralizing force F is equal to $2\,Pd/l$, wherein P is the tension force of the spring, $l$ is its length and $d$ is the lateral deflection of its central portion. Obviously, the ratio of $2\,d/l$ may be twenty times or more. Hence, a centralizing biasing force of less than a gram may be obtained by a spring having 20 grams or more of tension. Thus, very small biasing forces are obtained by springs which are not so delicate as to be impractical to manufacture and handle.

Figure 3:
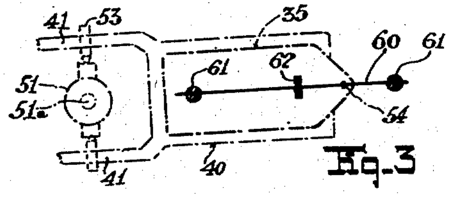
Figure 3 is a diagrammatic view illustrating a modification of my invention.

Broadly, the biasing means which I provide for the reproducer is one comprising a straight spring which is definitely and accurately positioned at its ends in relation to the carriage, preferably on a radius line of the vertical pivot axis 51*a* about which the reproducer obtains its lateral freedom of movement, and which has a central portion with lateral compliance to which is connected a movable portion of the reproducer. This basic arrangement may obviously be fulfilled by other means than that hereinabove specifically described. For example, as shown diagrammatically in Figure 3, there may be used a flat leaf spring 60 in place of the helical tension spring 55. The ends of this leaf spring may slidably engage slotted pins 61 carried by the carriage to support the spring so that it is in a radius line of the vertical pivot axis 51*a*. Standing up from the reproducer is a forked member 62 which slidably embraces the opposite sides of the central portion of the leaf spring 60 to hold the reproducer yieldably in a centralized position relative to the carriage. Also, simply by making the fork 62 higher than the width of the leaf spring 60, the fork may slide up and down relative to the spring to permit the reproducer to be lowered on and raised from a mounted record.

The embodiments of my invention herein particularly described are intended to be illustrative and not necessarily limitative of my invention since the same are subject to changes and modifications without departure from the scope of my invention, which I endeavor to express according to the following claims.

I claim:

1. In a phonographic reproducing machine comprising a rotatable support for a record: the combination of a carriage mounted for traveling movement relative to a supported record; a phonographic reproducing device having a record-cooperable stylus for contacting a supported record; means movably connecting said reproducing device to said carriage to enable said stylus to have a lateral freedom of movement relative to the carriage in directions of traveling movement of the latter; a straight spring having opposite end portions thereof supported by and definitely located in relation to said carriage, said spring having a laterally yieldable central portion; and means connecting said reproducing device to said central portion for yieldably retaining said reproducing device in a predetermined position in relation to the carriage.

2. The combination set forth in claim 1 wherein said straight spring is a helical one supported by said carriage under tension.

3. The combination set forth in claim 1 wherein said straight spring is of a flat leaf type having its medial plane at right angles to the directions of movement of a movable portion of said reproducing device, and said connecting means intercouples the central portion of said leaf spring to said movable portion of the device.

4. The combination set forth in claim 1 including means connected to one end of said straight spring and adjustably mounted on said carriage to shift the position into which the reproducing device is biased.

5. In a phonographic reproducing machine comprising a rotatable support for a record: the combination of a carriage mounted for traveling movement relative to a supported record; a phonographic reproducing device having a record-cooperable stylus for contacting a supported record; means pivotally connecting said reproducing device to said carriage for pivotal movement about an axis at right angles to the directions of traveling movement of said carriage; a straight spring having the opposite end portions thereof supported by and definitely located relative to the carriage with the longitudinal axis of the spring coinciding substantially with the radius line of the said pivot axis, said spring having a central portion with a lateral compliance; and means embracing said central portion and secured to said reproducing device for yieldably holding the latter in a definite position relative to the carriage.

6. In a phonographic reproducing machine comprising a rotatable support for a record: the combination of a carriage mounted for traveling movement relative to a supported record; a phonographic reproducing device having a record-cooperable stylus at a free end portion thereof pivotally supported by said carriage on a first axis for lateral movement of said stylus relative to said carriage in directions of traveling movement of the latter, and said device being also supported by said carriage on a second axis for movement of the stylus towards and away from the record; a tension spring supported by said carriage in a position wherein the longitudinal axis of the spring is in a plane including said pivot axis and said stylus; and means embracing a central portion of said spring and connected to said free end portion of the reproducing device, said central portion of the spring having a lateral compliance for yieldably holding said reproducer centered within its lateral range of movement relative to the carriage, and said central spring portion further having a compliance in directions towards and away from the record enabling said stylus to be moved into and out of engagement with the record.

7. In a phonographic reproducing machine comprising a rotatable support for a record: the combination of a carriage mounted for traveling movement relative to a supported record; a phonographic reproducing device having a record-cooperable stylus at a free end portion thereof pivotally supported by said carriage on a first axis for lateral movement of said stylus relative to said carriage in directions of traveling movement of the latter, and said device being also supported by said carriage on a second axis for movement of the stylus towards and away from the record; a straight flat spring supported at its ends by said carriage in a position wherein the medial plane of the spring includes said first pivot axis and said stylus, said spring having a central portion with lateral compliance; and a fork member slidably embracing said central portion and connected to said free end portion of the reproducing device for yieldably holding the latter centered in its lateral range of movement relative to the carriage, said fork being slidable with respect to said spring in directions towards and away from the record whereby to enable the stylus to be engaged with and disengaged from the record.

8. In a phonographic reproducing machine comprising a rotatable support for a disk record: the combination of a carriage mounted for traveling movement along a radius line of the record support; a reproducing device having a movable portion provided with a record-cooperable stylus, said device being pivotally supported by said carriage on an axis at right angles to the face of said record to enable said stylus to have a lateral freedom of movement in relation to the record, said stylus being positioned to engage said record at a distance from said radius line; and means biasing said reproducing device into a centralized position wherein a line through said pivot axis and stylus is tangent to the record groove engaged by the stylus when the reproducing device is in the central portion of its range of traveling movement across the record.

9. The combination set forth in claim 8 wherein said biasing means comprises a tension spring supported at its ends by said carriage and lying in a position wherein the longitudinal axis of the spring coincides substantially with a radius line of said pivot axis, and a member embracing the central portion of said tension spring and connected to said movable portion of the reproducing device.

10. In a phonographic reproducing machine including a rotatable support for a disk record and a reproducer device having a record-cooperating stylus for tracking a groove of the record as the latter is turned: the combination of a carriage for said reproducing device mounted for traveling movement along a radius line of the record support, said carriage supporting said reproducing device in a position wherein said stylus engages the record at a distance from said radius line; means pivotally securing said reproducing device to said carriage on an axis which is at right angles to the face of said record and spaced in advance of said stylus relative to the direction of rotation of the record; a tension spring connected at its ends to said carriage and held so that its longitudinal axis is substantially parallel to a radius line of said pivot axis; and means embracing a central portion of said spring and connected to said reproducing device for yieldably holding the latter in a centralized position wherein a line through said pivot axis and stylus is substantially tangent to the record groove engaged by the stylus when said reproducing device is in a central portion of its range of traveling movement across the record.

RICHARD M. SOMERS.

REFERENCES CITED

The following references are of record in the file of this patent:

UNITED STATES PATENTS

| Number | Name | Date |
|---|---|---|
| 1,119,113 | Pierman | Dec. 1, 1914 |
| 2,354,558 | Thompson | July 25, 1944 |
| 2,357,033 | Thompson | Aug. 29, 1944 |